United States Patent
Teslak et al.

(10) Patent No.: US 10,166,989 B2
(45) Date of Patent: *Jan. 1, 2019

(54) CLUTCH TORQUE TRAJECTORY CORRECTION TO PROVIDE TORQUE HOLE FILLING DURING A RATIO UPSHIFT

(71) Applicant: Ford Global Technologies, LLC, Dearborn, MI (US)

(72) Inventors: Christopher John Teslak, Plymouth, MI (US); Gregory Michael Pietron, Canton, MI (US); Hongtei Eric Tseng, Canton, MI (US); Yuji Fujii, Ann Arbor, MI (US); Michael Glenn Fodor, Dearborn, MI (US); Diana Yanakiev, Birmingham, MI (US); Seung-Hoon Lee, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/987,466

(22) Filed: Jan. 4, 2016

(65) Prior Publication Data
US 2016/0114803 A1    Apr. 28, 2016

Related U.S. Application Data

(63) Continuation of application No. 14/295,411, filed on Jun. 4, 2014, now Pat. No. 9,260,102, which is a
(Continued)

(51) Int. Cl.
*B60W 30/19*    (2012.01)
*F16H 59/16*    (2006.01)
(Continued)

(52) U.S. Cl.
CPC ............ *B60W 30/19* (2013.01); *B60W 10/02* (2013.01); *B60W 10/06* (2013.01);
(Continued)

(58) Field of Classification Search
CPC ...... B60W 30/19; B60W 10/06; B60W 50/06; B60W 10/02; B60W 10/115;
(Continued)

(56) References Cited

U.S. PATENT DOCUMENTS 4,220,058 A * 9/1980 Petzold ................. F16H 61/061
                                                                    192/15
4,582,185 A    4/1986 Grimes et al.
(Continued)

FOREIGN PATENT DOCUMENTS

CN    1820157 A    8/2006
CN    1971099 A    5/2007
(Continued)

OTHER PUBLICATIONS

Office Action dated Jun. 12, 2013 for U.S. Appl. No. 13/155,867, filed Jun. 8, 2011, pp. 1-6.
(Continued)

*Primary Examiner* — Mary Cheung
(74) *Attorney, Agent, or Firm* — James Dottavio; Brooks Kushman P.C.

(57) ABSTRACT

A control system and method for controlling a multiple gear ratio automatic transmission in a powertrain for an automatic transmission having pressure activated friction torque elements to effect gear ratio upshifts. The friction torque elements are synchronously engaged and released during a torque phase of an upshift event as torque from a torque source is increased while allowing the off-going friction elements to slip, followed by an inertia phase during which torque from a torque source is modulated. A perceptible
(Continued)

transmission output torque reduction during an upshift is avoided. Measured torque values are used during a torque phase of the upshift to correct an estimated oncoming friction element target torque so that transient torque disturbances at an oncoming clutch are avoided and torque transients at the output shaft are reduced.

20 Claims, 10 Drawing Sheets

Related U.S. Application Data continuation of application No. 13/155,867, filed on Jun. 8, 2011, now Pat. No. 8,775,044.

(51) Int. Cl.

| | |
|---|---|
| *F16H 61/06* | (2006.01) |
| *F16D 67/02* | (2006.01) |
| *B60W 10/02* | (2006.01) |
| *B60W 10/115* | (2012.01) |
| *B60W 10/06* | (2006.01) |
| *B60W 50/06* | (2006.01) |
| *F16H 61/04* | (2006.01) |
| *B60W 50/00* | (2006.01) |

(52) U.S. Cl.
CPC .......... *B60W 10/115* (2013.01); *B60W 50/06* (2013.01); *F16D 67/02* (2013.01); *F16H 59/16* (2013.01); *F16H 61/061* (2013.01); *B60W 2050/0008* (2013.01); *B60W 2050/0043* (2013.01); *B60W 2510/0275* (2013.01); *B60W 2510/105* (2013.01); *B60W 2710/025* (2013.01); *B60W 2710/027* (2013.01); *B60W 2710/0666* (2013.01); *B60W 2710/105* (2013.01); *F16H 2061/0462* (2013.01); *Y10T 477/641* (2015.01); *Y10T 477/6425* (2015.01)

(58) Field of Classification Search
CPC . B60W 2050/0008; B60W 2050/0043; B60W 2510/0275; B60W 2510/105; B60W 2710/105; B60W 2710/025; B60W 2710/027; B60W 2710/0666; F16D 67/02; F16H 61/061; F16H 59/16; F16H 2061/0462; Y10T 477/6425; Y10T 477/641
See application file for complete search history.

(56) References Cited

U.S. PATENT DOCUMENTS

| | | | |
|---|---|---|---|
| 4,724,723 A | 2/1988 | Lockhart et al. | |
| 4,744,031 A | 5/1988 | Takeda et al. | |
| 4,790,418 A | 12/1988 | Brown et al. | |
| 4,792,902 A | 12/1988 | Hrovat et al. | |
| 4,855,914 A | 8/1989 | Davis et al. | |
| 5,058,015 A | 10/1991 | Leorat | |
| 5,092,182 A | 3/1992 | Ikeda et al. | |
| 5,105,357 A | 4/1992 | Steeby | |
| 5,133,227 A | 7/1992 | Iwatsuki | |
| 5,165,286 A | 11/1992 | Hamamura et al. | |
| 5,188,005 A | 2/1993 | Sankpal et al. | |
| 5,667,458 A | 9/1997 | Narita et al. | |
| 5,669,851 A | 9/1997 | Tietze | |
| 5,839,987 A | 11/1998 | Sawamura et al. | |
| 5,916,293 A | 6/1999 | Katakura et al. | |
| 6,278,926 B1 | 8/2001 | Jain et al. | |
| 6,482,125 B2 | 11/2002 | Urasawa | |
| 6,698,299 B2 | 3/2004 | Cripe | |
| 6,832,976 B2 | 12/2004 | Nishida et al. | |
| 6,846,260 B2 | 1/2005 | Horiuchi | |
| 6,949,051 B2 | 9/2005 | Katakura | |
| 6,991,584 B2 | 1/2006 | Cowan | |
| 7,178,618 B2 | 2/2007 | Komeda et al. | |
| 7,243,557 B2 | 7/2007 | May | |
| 7,300,381 B2 | 11/2007 | Badillo et al. | |
| 7,351,183 B2 | 4/2008 | Fujii et al. | |
| 7,370,516 B2 | 5/2008 | Etchason | |
| 7,478,572 B2 | 1/2009 | Maten et al. | |
| 7,503,875 B2 | 3/2009 | Fujii et al. | |
| 7,698,041 B2 | 4/2010 | Streib | |
| 8,224,538 B2 | 7/2012 | Zhang et al. | |
| 8,290,668 B2 | 10/2012 | Hirasako et al. | |
| 8,328,688 B2 | 12/2012 | Fujii et al. | |
| 8,337,361 B2 | 12/2012 | Fujii et al. | |
| 8,529,405 B2 | 9/2013 | Fujii et al. | |
| 8,529,406 B2 | 9/2013 | Fujii et al. | |
| 8,636,613 B2 | 1/2014 | Teslak et al. | |
| 8,775,044 B2 | 7/2014 | Teslak et al. | |
| 2002/0025885 A1 | 2/2002 | Saito et al. | |
| 2004/0214687 A1 | 10/2004 | Morisawa et al. | |
| 2004/0242374 A1 | 12/2004 | Wheals | |
| 2005/0216159 A1* | 9/2005 | Whittton | F16H 61/061 701/67 |
| 2006/0135316 A1 | 6/2006 | Fujii et al. | |
| 2008/0119320 A1 | 5/2008 | Wu et al. | |
| 2008/0139362 A1 | 6/2008 | Fujii et al. | |
| 2009/0118086 A1 | 5/2009 | Heap et al. | |
| 2010/0318269 A1 | 12/2010 | Yanakiev et al. | |
| 2011/0184612 A1 | 7/2011 | Fujii et al. | |
| 2012/0130608 A1 | 5/2012 | Fujii et al. | |
| 2012/0130610 A1 | 5/2012 | Lee et al. | |
| 2012/0303191 A1 | 11/2012 | McGrogan et al. | |
| 2014/0121059 A1 | 5/2014 | Teslak et al. | |
| 2014/0287872 A1 | 9/2014 | Teslak et al. | |

FOREIGN PATENT DOCUMENTS

| | | |
|---|---|---|
| CN | 102072314 A | 5/2011 |
| DE | 19702834 A1 | 7/1997 |
| DE | 102010016334 A1 | 10/2010 |
| EP | 1296085 A2 | 3/2003 |
| JP | 3430272 B2 | 7/2003 |

OTHER PUBLICATIONS

Final Office Action dated Nov. 21, 2013 for U.S. Appl. No. 13/155,867, filed Jun. 8, 2011, pp. 1-6.
Notice of Allowance dated Sep. 20, 2013 for U.S. Appl. No. 13/330,120, filed Dec. 19, 2011, pp. 1-11.
German Examination Report for DE 1020122228373; dated Aug. 6, 2014; 6 pages.
Notice of Allowance dated Mar. 4, 2014 for U.S. Appl. No. 13/155,867, filed Jun. 8, 2011, 9 pages.
Office Action of corresponding Chinese application CN 201210189651.0; dated Jul. 27, 2015; 5 pages.
Notice of Allowance dated Oct. 9, 2015 for U.S. Appl. No. 14/295,411, filed Jun. 4, 2014, 21 pages.

* cited by examiner

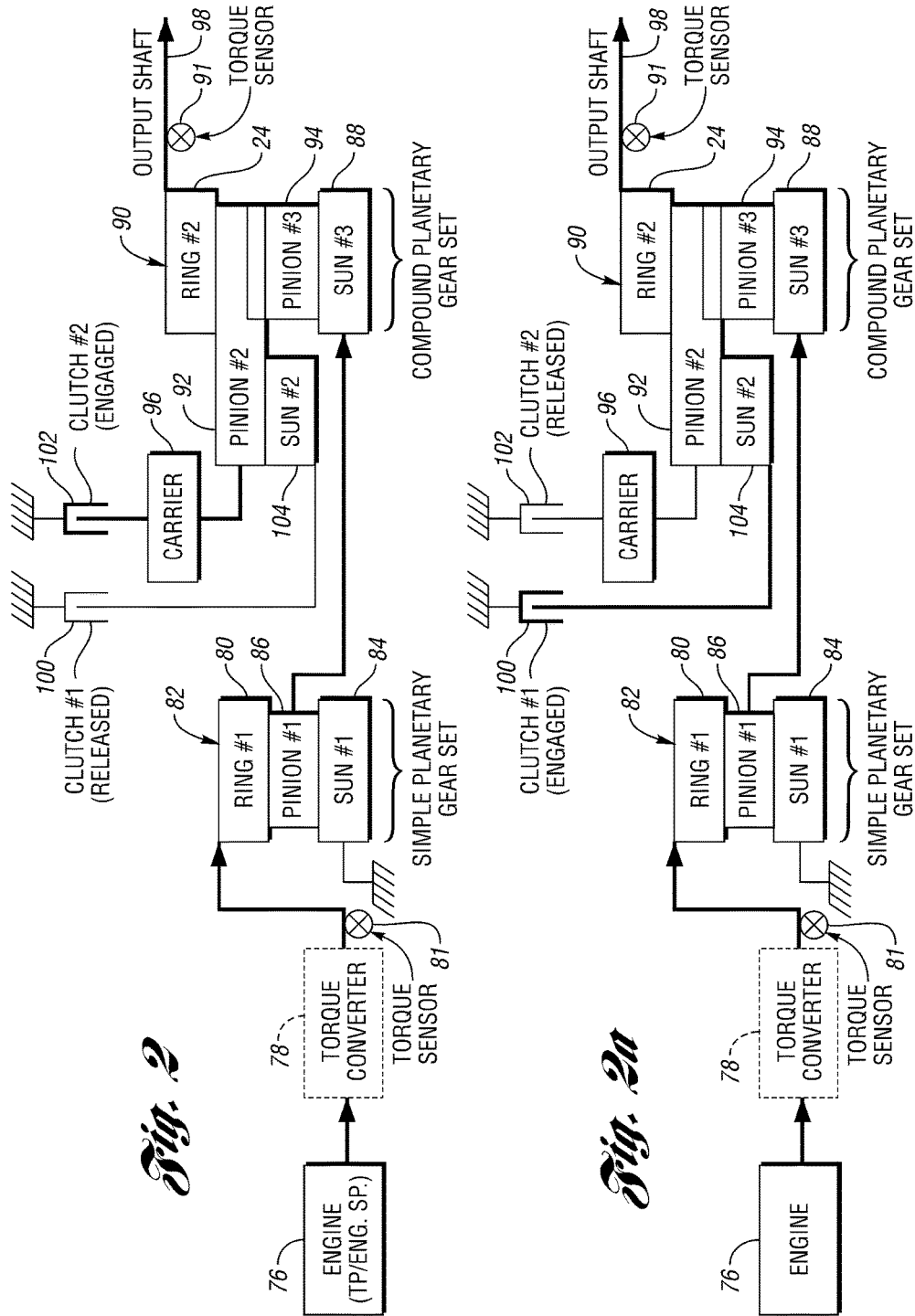

CLUTCH TORQUE TRAJECTORY CORRECTION TO PROVIDE TORQUE HOLE FILLING DURING A RATIO UPSHIFT

CROSS-REFERENCE TO RELATED APPLICATIONS

This application is a continuation of U.S. application Ser. No. 14/295,411 filed Jun. 4, 2014, now U.S. Pat. No. 9,260,102, which is a continuation of U.S. application Ser. No. 13/155,867, filed Jun. 8, 2011, now U.S. Pat. No. 8,775,044, the disclosures of which are hereby incorporated in their entirety by reference herein.

TECHNICAL FIELD

The invention relates to a multiple ratio transmission mechanism in a powertrain for an automotive vehicle and to a strategy for achieving smooth engagement and release of friction torque establishing elements during a transmission ratio upshift

BACKGROUND

A step-ratio automatic transmission uses multiple friction elements for automatic gear ratio shifting. A ratio change from a low gear ratio to a high gear ratio occurs in a synchronous clutch-to-clutch upshift as one friction element is engaged and a second friction element is disengaged. One friction element may be referred to as an off-going clutch (OGC). It is released while a second friction element, which may be referred to as an oncoming clutch (OCC), engages to create the upshift. The upshift event is divided into a preparatory phase, a torque phase and an inertia phase. During the preparatory phase, the OCC actuator is stroked to prepare for its engagement, while the OGC torque-holding capacity is reduced to prepare for its release. During the torque phase, the OCC torque is raised in a controlled manner while the OGC is still engaged or allowed to slip at a controlled slip rate.

Simultaneous engagement of the OCC and release of OGC in a conventional transmission upshift may result in a momentary activation of two torque flow paths through the gearing. During the torque phase, the lower gear speed ratio from input to output is maintained. However, as the OCC gains torque capacity and the OGC loses it, more of the input torque is routed through higher gear path until, when the OGC no longer has any capacity, all of the torque is routed through the higher gear path, which has a lower torque ratio. Thus, in the small timespan of the torque transfer, the input torque goes from being multiplied by a higher amount to a lower amount before the inertia of the subsequent speed change raises the output torque again. This momentary dropping and subsequent rise of output torque is known as the "torque hole." This is perceived by a vehicle occupant as an unpleasant shift shock. The inertia phase begins when the OGC is released or has no significant torque capacity.

SUMMARY

An objective of the present invention is to eliminate or reduce the torque hole effect while reducing transient torque disturbances during an upshift event. A transmission controller can provide estimated friction element torque targets using friction element actuator pressures in the case of a transmission control system with pressure operated actuators. The controller executes control algorithms in a software control strategy without knowing actual torque profiles for the oncoming and off-going friction elements.

Powertrain sensors, in a control system embodying the present invention, provide direct reading of operating variables such as output torque. They are used, together with physical properties and functions of the transmission and driveline components, algorithms governing those functions and appropriate transfer functions, to provide accurate torque values for the oncoming and off-going clutches. The sensors provide torque feedback signals for correcting estimates of friction element torque in a closed loop fashion during calculations of actuator pressures.

The invention includes a control strategy for coordinating the actuators to achieve minimal torque disturbance at the output shaft. The algorithms, if used without the actual torque feedback provided by the sensors, do not have the ability to accurately estimate in real time the clutch torques during an upshift. They determine what the desired clutch torque would be and assume, based on a clutch model, that this torque will be delivered using a calibrated transfer function between clutch pressure command and clutch torque. The clutch actuators, however, are non-linear and their response to control pressures is affected by variables such as transmission oil temperature and other environmental factors. This can result in OCC torque transients or disturbances.

The invention uses a feedback control that uses one or more sensors (e.g., torque sensors) to develop an actual, real time sensor feedback (e.g., torque feedback) to calculate an oncoming friction element torque to ensure that the oncoming friction element torque tracks a target torque and to obtain a desired off-going friction element torque to obtain a controlled slip of the off-going friction element. A torque sensor signal that is used to calculate current corrected oncoming and off-going friction element torque values is a direct torque measurement. For example, a torque sensor can be located at a transmission torque input shaft or at a transmission torque output shaft, or at both locations. Torque at other locations can be calculated using the direct readings for the sensors.

When the transmission input and output torques are known, the friction element torques can be calculated during the shift using a technique that is disclosed in U.S. application Ser. No. 12/861,387, filed Aug. 23, 2010, now U.S. Pat. No. 8,510,003, issued Aug. 13, 2013, which is assigned to the assignee of the present invention. Reference also may be made to U.S. Patent Publication 2010/0262344, filed Apr. 9, 2009, now U.S. Pat. No. 8,255,130, issued Oct. 14, 2010 which also is assigned to the assignee of the present invention. Those references explain, for example, how to estimate the input shaft torque if only the output shaft torque is measured, and vice versa.

By knowing the friction element torques, performance and predictability of the algorithms can be improved because it is possible to determine if a friction element torque is actually achieved and to provide accurate modulation of the OCC actuator pressures so that torque transients at the OCC are minimized as the OGC has a controlled slip. The target level of the OCC torque capacity is determined using governing equations to achieve a seamless output shaft torque transition from the torque phase of an upshift to an inertia phase.

A companion co-pending continuation-in-part patent application, which is assigned to the assignee of the present invention, discloses a control strategy for achieving a smooth upshift in a multiple ratio transmission without sensor feedback. The co-pending patent application is application Ser. No. 12/858,468, filed Aug. 18, 2010, now U.S. Pat. No. 8,328,688, issued Dec. 11, 2012. The present application has some features that are common to that co-pending application.

BRIEF DESCRIPTION OF THE DRAWINGS

FIG. 2 is a schematic representation of a planetary type transmission that is capable of embodying the invention wherein the elements of the planetary gearing are conditioned for a low or first gear operating mode.

FIG. 2a is a schematic representation corresponding to FIG. 2 wherein the elements are conditioned for a second or high gear operating mode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
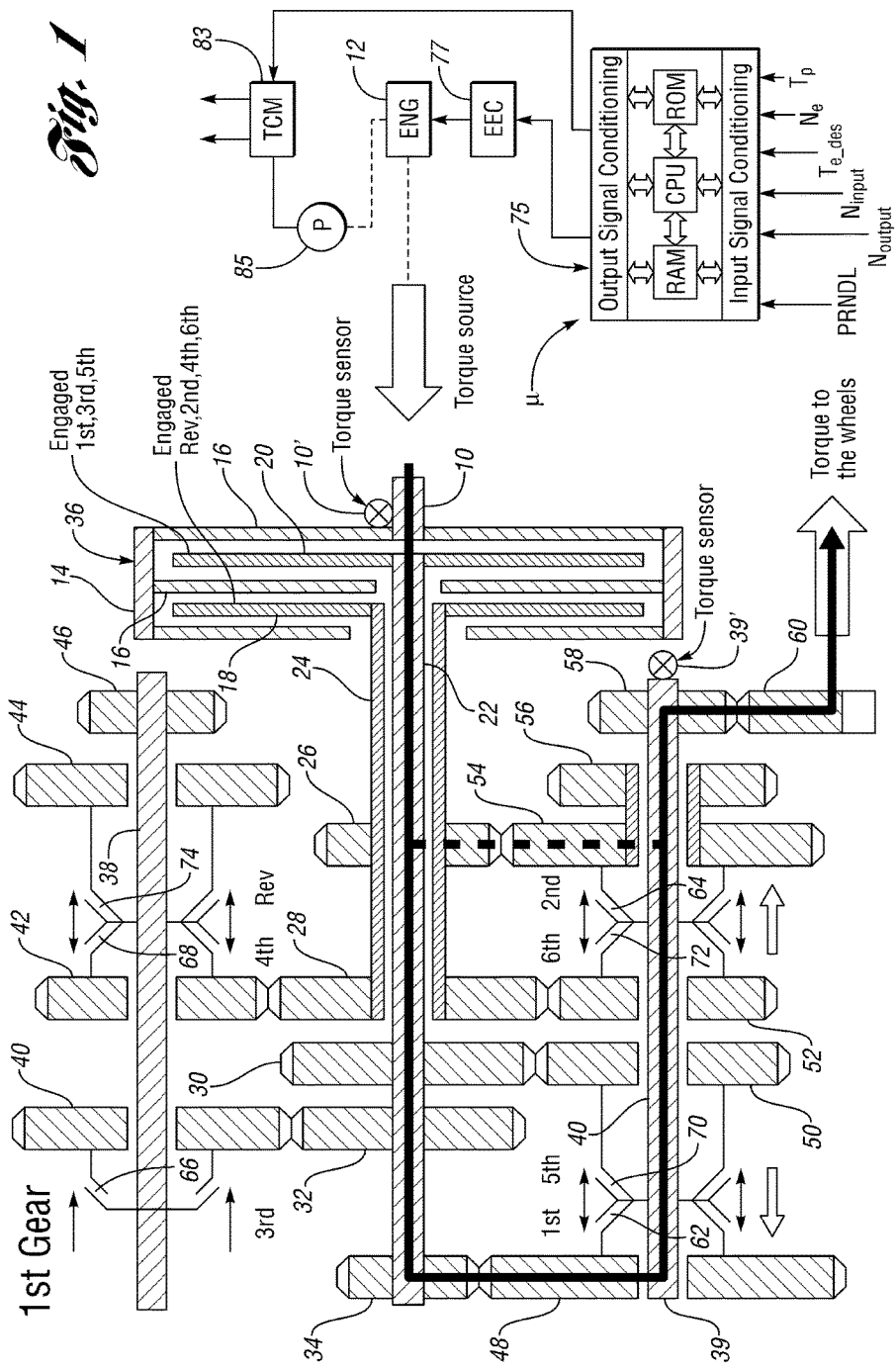
FIG. 1 is a schematic illustration of a layshaft transmission in a first gear or low gear operating mode, which includes tandem torque input clutches that are selectively and alternately engaged and released.

FIG. 1 shows in schematic form a lay-shaft transmission capable of embodying the invention together with a schematic representation of the transmission components involved in gear ratio changes.

Numeral 10 represents a power input shaft drivably connected to torque source 12. Input shaft 10 drives a clutch housing 14, which carries torque input driving discs 16 situated in interdigital relationship with respect to driven discs 18 and 20. A fluid pressure actuator or electro-mechanical actuator of any known design is used to selectively engage driven discs 18 and 20 with respect to driving discs 16. Discs 20 are connected to a central torque input shaft 22 and discs 18 are connected to torque input sleeve shaft 24. Although only one disc 18 and only one disc 20 are shown in the schematic view of FIGS. 1 and 1a, several discs in a friction disc assembly may be used.

Drive gear elements 26 and 28 are connected drivably to the sleeve shaft 24. Gear element 26 has a smaller pitch diameter than gear element 28.

Central power input shaft 22 is drivably connected to drive gear element 30, gear element 32 and gear element 34, which have decreasing pitch diameters.

When driving clutch discs 20 are engaged, driving torque is distributed through engaged clutch discs 20 to the gear elements 30, 32 and 34. Clutch discs 20 and 18 are part of a clutch structure that may be referred to as a tandem or dual clutch 36.

When clutch discs 18 are engaged by the tandem clutch 36, torque from the torque source is distributed directly to torque input gears 26 and 28.

The layshaft transmission of FIG. 1 has two countershafts, shown at 38 and 40. Countershaft 38 supports rotatably a third ratio countershaft gear element 40, a fourth ratio countershaft gear element 42 and a reverse countershaft gear element 44. A torque transfer gear element 46 is directly connected to the countershaft 38.

Countershaft 40 rotatably supports countershaft gear elements 48, 50 and 52, which have progressively decreasing pitch diameters. Countershaft gear element 48 is a first ratio gear element, countershaft gear element 50 is a fifth ratio gear element and countershaft gear element 52 is a sixth ratio gear element.

Countershaft gear elements 54 and 56 also are rotatably supported by countershaft 40. Gear element 54 drivably engages gear element 26 during second ratio operation. Countershaft gear element 56 drivably engages a reverse drive pinion (not shown), which in turn drivably engages reverse gear element 44 during reverse drive operation. Gear element 46 connected to countershaft 38 is drivably connected to gear element 58, which is drivably connected to countershaft 40, for example, through torque transfer gearing (not shown in FIG. 1). The countershafts and the central shaft 22 actually are not in the same plane, so torque transfer gearing and the reverse drive pinions are not illustrated in the schematic illustration of FIG. 1.

Gear 58 is connected drivably to torque output gear 60, which is drivably connected to vehicle traction wheels.

During first gear ratio operation, gear 48 is connected drivably through synchronizer clutch 62 to countershaft 40, and clutch 36 engages discs 20 as discs 18 are disengaged. At that time, second ratio synchronizer clutch 64 drivably engages gear element 54 to precondition gear element 54 for second ratio operation. Power then is delivered from the torque source through clutch discs 20 to central shaft 22 so that torque is delivered from gear 34, to countershaft 40 and engaged gears 58 and 60.

An upshift is made from the first gear ratio to the second gear ratio by disengaging clutch discs 20 and engaging clutch discs 18 for the tandem clutch. To make a smooth transition from the first gear ratio to the second gear ratio, discs 18 are engaged as discs 20 are slowly disengaged to allow for clutch slip. At this time, third ratio synchronizer clutch 66 is engaged thereby connecting countershaft gear element 40 to countershaft 38. This preselects third ratio while the transmission operates in the second ratio. An upshift to the third ratio is achieved by tandem clutch 36 as clutch discs 20 are engaged and clutch discs 18 are disengaged. At this time, the fourth ratio synchronizer clutch 68 is engaged to preselect the fourth ratio. An upshift from the third gear ratio to the fourth gear ratio then is achieved by disengaging clutch discs 20 and engaging clutch discs 18. At this time, fifth gear ratio is preselected by engaging synchronizer clutch 70. An upshift to the fifth ratio then is achieved by engaging friction discs 20 and disengaging friction discs 18. At this time, the sixth ratio is preselected by engaging synchronizer clutch 72.

An upshift to the sixth ratio is achieved by again trading engagement of the discs for the tandem clutch 36. Clutch discs 20 are disengaged as clutch discs 18 are engaged.

Reverse drive is obtained by disengaging the forward drive synchronizer clutch and engaging reverse drive synchronizer clutch 74. Reverse driving torque then is delivered through sleeve shaft 24, gear 26, gear element 54 and gear element 56, reverse drive pinion gearing, countershaft 38 and torque transfer gear elements 46 and 58.

If the torque source is an internal combustion engine, the upshift controls would include a microprocessor 75, which may be of conventional design, an electronic engine control 77, including an engine fuel and spark retard controller, and a transmission control module 83.

The microprocessor 75, when the torque source is an engine, receives input signals such as driver desired input torque ($T_{e\_des}$) input speed ($N_e$), driver-selected ratio range (PRNDL), transmission input speed ($N_{input}$), engine throttle position (Tp) if the torque source is a throttle-controlled engine, and transmission output speed ($N_{output}$). The input signals are received by random access memory (RAM) from data input ports. A central processor unit (CPU) receives the input signals that are stored in RAM and uses the information fetched from RAM to execute algorithms that define control strategies stored in ROM. Output signals are delivered from signal output ports to the controllers 77 and 83. Actuating pressure for the clutches is supplied by pump 85 driven by engine 12 or by an electro-magnetic force actuator.

Figure 1A:
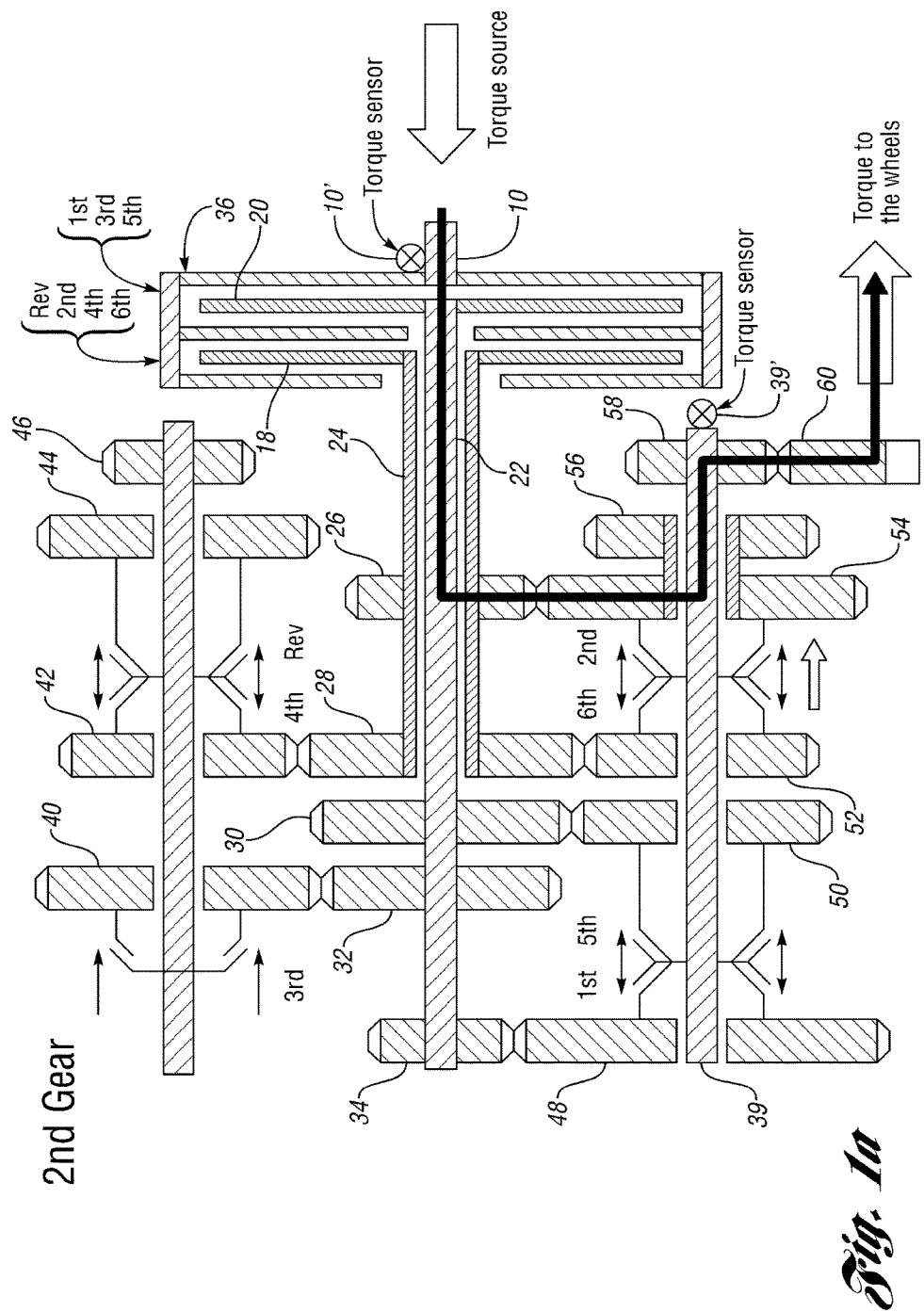
FIG. 1a is a schematic illustration of the gearing arrangement of FIG. 1 wherein the elements of the gearing are conditioned for high or second gear operating mode.

FIG. 1*a* shows the gearing configuration during operation of the transmission in second gear ratio, which is the upshifted ratio. When the transmission operates in the second ratio, torque is delivered, as previously mentioned, to sleeve shaft 24 and through a second gear set, which comprises gear 26, gear element 54 and transfer gears 58 and 60. This gearing may be referred to as the second gear set. The gearing previously described with respect to FIG. 1 for first gear operation hereafter may be referred to as the first gear set.

FIGS. 2 and 2*a* show a schematic representation of a planetary type transmission that may embody the present invention. A torque source may be an engine 76 that drives a ring gear 80 of a simple planetary gear unit 82, which has a sun gear 84 and a planetary carrier 86. A hydrokinetic torque converter may be included in the transmission if a design objective requires it. It is shown at 78 in FIGS. 2 and 2*a* with phantom dotted lines since some designs capable of using the invention do not need a torque converter. If a torque converter is included, the converter turbine torque would be the input torque. The torque converter could be deleted if it is not needed. Carrier 86 supports planetary pinions that engage ring gear 80 and sun gear 84. The output torque from the carrier drives sun gear 88 of a compound planetary gear set 90. Compound planetary pinions 92 and 94 supported on a common carrier 96 engage respectively ring gear 90 and sun gear 88. The ring gear is connected to the output shaft 98.

During low gear ratio operation, friction brake 100 is disengaged. Brake 100 may be referred to as clutch #1. This corresponds to tandem clutch 36 of FIGS. 1 and 1*a* when clutch discs 18 are released or disengaged. Brake 102 in FIG. 2, which is engaged in low speed ratio operation, corresponds to tandem clutch 36 shown in FIGS. 1 and 1*a* when clutch discs 20 are engaged. Clutch #2 in FIG. 2 (brake 102) provides a reaction point for the carrier 96. Sun gear, shown at 104, which drivably engages with compound planetary pinion 92, merely idles during low speed ratio operation.

When the gearing of FIGS. 2 and 2*a* is operating in the second ratio, sun gear 104 is anchored by brake 100 so that the ring gear for compound planetary gear unit 92 is driven at an increased rate relative to the carrier speed of the simple planetary gear set 82.

For purposes of this description, it will be assumed that if the powertrain has no hydrokinetic torque converter, torque input to the transmission will be referred to as engine torque ($T_e$). If the powertrain has a torque converter, the engine torque would be replaced by converter turbine torque.

Figure 2B:
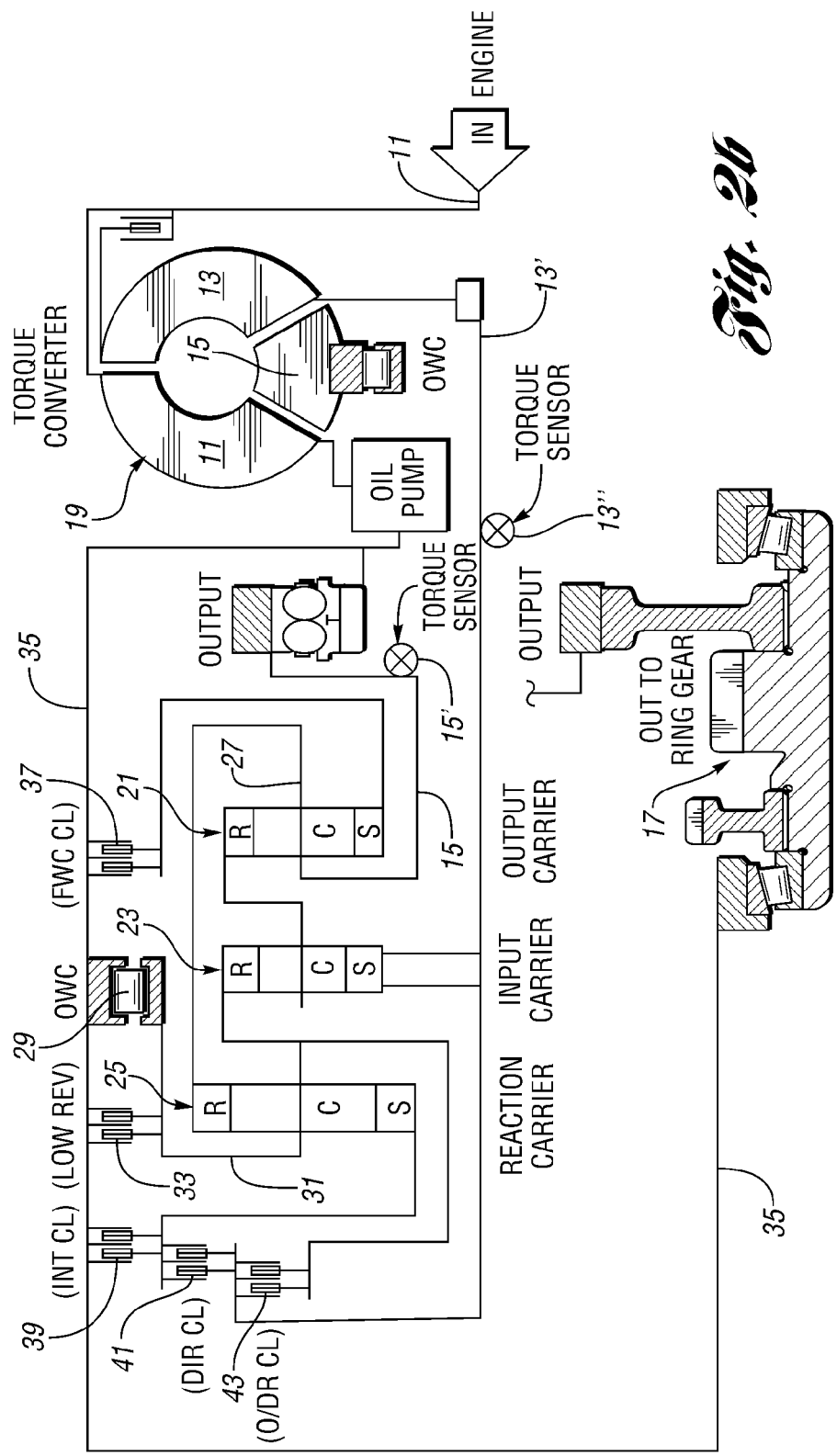
FIG. 2b is a schematic representation of another planetary transmission that is capable of embodying the invention.

FIG. 2*b* shows an example of another planetary step-ratio automatic transmission that may embody the invention. It comprises an engine driven torque input shaft 11 and a transmission input shaft 13'. A transmission output shaft 15 delivers torque to transmission torque output gearing 17. A torque converter 19 may be disposed between engine driven torque input shaft 11 and transmission input shaft 13'. A torque converter impeller 11 is in fluid flow relationship with respect to turbine 13. A stator 17 is disposed between the flow inlet section of impeller 11 and the flow exit section of turbine 13.

In the example of a planetary transmission shown in FIG. 2*b*, there are three simple planetary gear units 21, 23 and 25. Output torque is delivered from the carrier 27 to the torque output gearing. Carrier 27 is connected to the ring gear for gear unit 25 and to output shaft 15. An overrunning coupling 29 anchors the carrier 31 of planetary gear unit 25 against rotation in one direction, but free wheeling motion is provided in the opposite direction. During reverse and during low ratio operation, carrier 31 is braked by coupling 33 against the transmission housing 35. During forward drive operation, the sun gear for gear unit 21 is anchored to the housing through forward drive coupling 37.

During intermediate ratio operation, the sun gear for gear unit 25 is anchored to the housing 35 by intermediate coupling 39.

During direct drive, the transmission input shaft 13' is clutched by direct coupling 41 to the sun gear for gear unit 25, thus establishing a one-to-one driving ratio through the planetary gearing. Overdrive coupling 43, when engaged, directly connects the carrier for gear unit 25 and the ring gear for gear unit 23 to the input shaft 13'.

FIG. 1 shows an engine 12, which acts as a source of torque for the transmission. If the transmission has a torque converter, engine speed will equal speed of the converter impeller and transmission input speed at shaft 10 would equal converter turbine speed.

As previously mentioned, torque sensors in the disclosed embodiments of the invention are used to obtain direct-reading oncoming and off-going clutch torques. In the case of the layshaft transmission of FIGS. 1 and 1*a*, the torque sensor 10' is located on torque input shaft 10 and a torque sensor 39' is located on torque output shaft 39. A measurement from the sensor 10' represents a sum of oncoming and off-going clutch torques when no significant inertia torque is present during a torque phase of an upshift. The clutch torques can be decomposed into oncoming and off-going clutch torque levels based on clutch actuator positions or apply forces whose measurements are readily available by pre-calibration. Alternatively, torque sensor 10' may be located on the central torque input shaft 22 or on the torque input sleeve shaft 24. In this case, the torque measurements at 22 and 24 directly represent torque transmitted through clutches 20 and 18, respectively.

In the case of the planetary transmission of FIGS. 2 and 2a, torque sensors 81 and 91 are respectively located on the transmission torque input shaft that drives ring gear 80 of planetary gear unit 82 and on the transmission torque output shaft that is driven by ring 24 of compound planetary gear unit 90. In the case of the transmission of FIG. 2b, a torque sensor 13" is located on torque input shaft 13', and a torque sensor 15' is located on torque output shaft 15.

Figure 3:
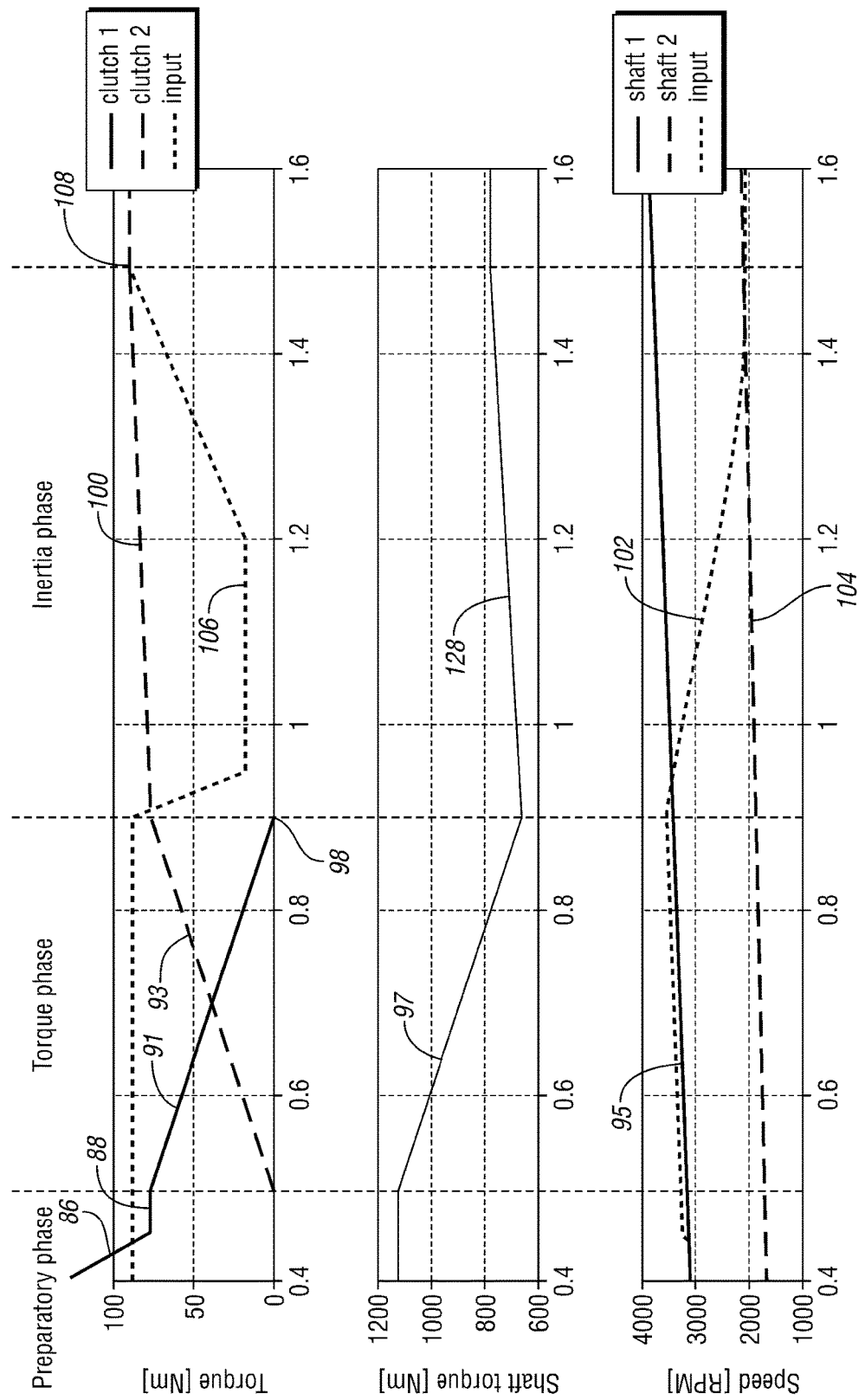
FIG. 3 is a time plot for a synchronous clutch-to-clutch upshift control characterized by a so-called torque hole at the output shaft.

FIG. 3 shows a time plot for a strategy for a typical known upshift event from a low gear configuration (i.e., high torque ratio) to a high gear configuration (i.e., low torque ratio) when the engine has a constant throttle setting, in accordance with a conventional upshift control method for a lay-shaft transmission of the type shown in FIGS. 1 and 1a. This strategy of the invention would apply also to a transmission such as the compound planetary transmission of FIGS. 2 and 2a and the planetary transmission of FIG. 2b.

The shift event is divided into a preparatory phase, a torque phase, and an inertia phase. During the preparatory phase, torque capacity of clutch 20, which is the off-going clutch, is reduced, as shown at 86, to prepare for its release. However, enough clutch torque capacity is maintained at 88 to only allow a small incipient slip near the end of the preparatory phase, as shown by the small separation between the dotted input torque line 106 and OGC line 86. Transmission controller 82 adjusts an actuator for clutch 18 (clutch #2), which is referred to as the oncoming clutch, to prepare for its engagement. At that point, the oncoming clutch 18, in a synchronous upshift event, is yet to carry significant torque.

During the torque phase of the control shown in FIG. 3, off-going clutch capacity is further reduced, as shown at 91, while the controller 82 increases oncoming clutch torque capacity, as shown at 93. Engine speed and input shaft speed are the same if the transmission has no torque converter between the engine and the clutch 36. However, as will be explained subsequently in a discussion of FIG. 4, off-going clutch torque capacity 91 may be controlled to induce a small target level slip at 91, which allows engine speed 95 to be higher than the speed of shaft. When the off-going clutch slips (without yet any torque capacity on the oncoming clutch), off-going clutch torque 91, or frictional torque generated by slipping, drives shaft 22, seen in FIGS. 1 and 1a, and the downstream gear elements (gearset #1), all the way to the output shaft. Increasing oncoming clutch torque 93 starts balancing torque distributed from the engine and reduces the off-going clutch torque capacity requirement at 91. Thus, the off-going clutch and the oncoming clutch work together to maintain off-going clutch target level slip as the off-going clutch torque decreases as shown at 91.

During the torque phase of the shift characteristic shown in FIG. 3, an increase in oncoming clutch torque capacity (clutch #2 capacity) reduces net torque flow through the off-going clutch. This shifts the torque path from the lower gear (with higher mechanical torque multiplication) to the higher gear (with lower mechanical torque multiplication). Thus, the output shaft torque drops significantly, as shown at 97, creating a so-called torque hole. A large torque hole can be perceived by a vehicle occupant as a sluggish powertrain performance or an unpleasant shift shock.

The inertia phase begins when the off-going clutch capacity is reduced to a non-significant level, as shown at 98. Oncoming clutch (clutch #2) carries enough torque capacity, as shown at 100, to pull down engine speed, as shown at 102, closer to that of the speed of shaft #2, as indicated at 104. FIG. 3 shows reduced input torque during the inertia phase, as shown at 106. This is typically due to engine spark timing control, which is common practice in the conventional shift control method, to enable the oncoming clutch to engage within a target shift duration without excessive torque capacity.

The shift event is completed, as shown in FIG. 3, when clutch #2 (the oncoming clutch) is engaged. The input shaft then is securely coupled to shaft 24, seen in FIG. 1, thereby matching engine speed 102 to shaft speed 104. The engine torque reduction at 106 is removed at 108 and the output shaft torque returns to the level that corresponds to an engine torque level during the high gear configuration.

Figure 4:
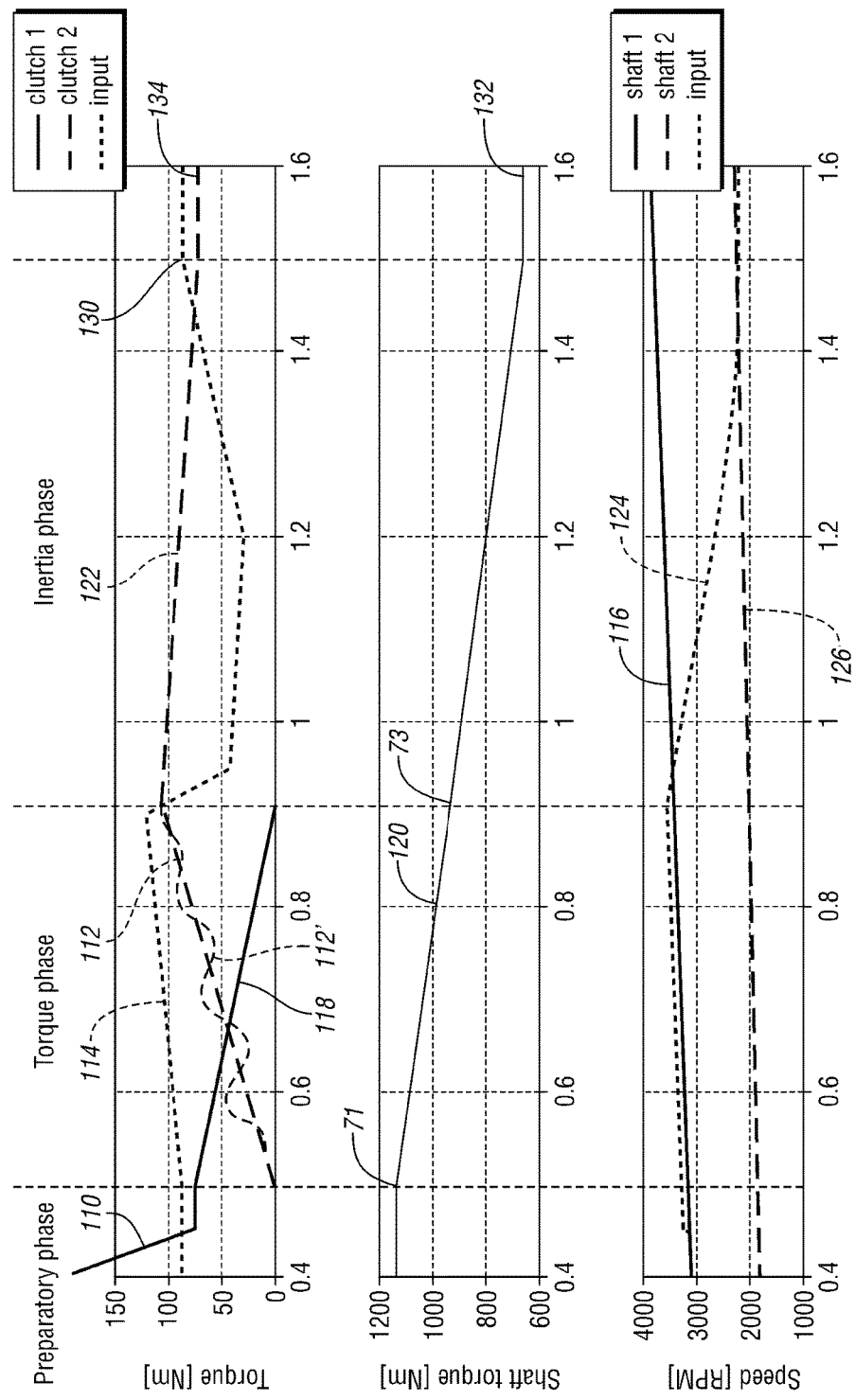
FIG. 4 is a time plot corresponding to FIG. 3 for the synchronous upshift control of the present invention wherein the torque hole is eliminated.

In contrast to the upshift characteristics shown in FIG. 3, FIG. 4 shows the upshift characteristics of an embodiment of the upshift control method of the invention. During the preparatory phase, the controller 83 reduces the torque capacity of the off-going clutch (discs 20) to prepare for its release, as shown at 110. The controller also adjusts the actuator piston for clutch 18 (the oncoming clutch) to prepare for its engagement.

During the torque phase, the controller 83 increases oncoming clutch target torque, as shown at 112 in FIG. 4, to prepare for OCC engagement according to a desired trajectory 112. Actuator corrections are shown at 112'. These corrections are achieved by using torque sensor data. The corrections help to better match the clutch torque with the target torque and reduce errors due to unforeseen or uncharacterized variation in the clutch actuator transfer function.

Input torque is increased, as shown at 114, while allowing clutch discs 20 to slip at a controlled level. Slipping the off-going clutch discs 20 causes input speed to be slightly greater than the shaft speed shown at 116, as shown at 124. This is true for a transmission having a slipping off-going clutch, but it is not true for a transmission with a locked off-going clutch.

When the off-going clutch 20 slips, its frictional torque is transmitted to shaft 22. Thus, the transmission controller can actively manage torque level that drives the gears coupled to the gearing connected to shaft 22 by adjusting the off-going clutch torque capacity 118. Similarly, when the oncoming clutch slips during the torque phase, its torque capacity, shown at 112, is transmitted to shaft 24, which drives the gearing (gearset #2) connected to shaft 24. Thus, when both the off-going clutch (OGC) and the oncoming clutch (OCC) slip during the torque phase, output shaft torque $\tau_{os}$ can be mathematically described as:

$$\tau_{os} = G_{on}\tau_{on} + G_{off}\tau_{off}, \qquad \text{Eq. (1)}$$

where $\tau_{on}$ is OCC torque capacity, $\tau_{off}$ is OGC torque capacity, $G_{off}$ is gear ratio for low gear operation and $G_{on}$ is gear ratio for high gear operation. Equation (1) can be rearranged as:

$$\tau_{on} = \frac{\tau_{os} - G_{off}\tau_{off}}{G_{on}} \qquad \text{Eq. (2)}$$

Rewriting $\tau_{os}$ as $\tau_{os,des}$, Eq. (2) can be expressed as:

$$\tau_{on} = \frac{\tau_{os,des} - G_{off}\tau_{off}}{G_{on}},\qquad \text{Eq. (3)}$$

where $\tau_{os,des}$ is a desired output shaft torque. The governing equation (3) of the present invention provides a systematic means to self-calibrate a level of OCC torque capacity $T_{on}$ for achieving a desired output torque profile $\tau_{os,des}$ while OGC slips during the torque phase. More specifically, torque profile $\tau_{os,des}$ can be specified to smoothly transition output shaft torque 120 before and after the torque phase, from point 71 to point 73 and after point 73, thereby eliminating or reducing the torque hole. OGC torque capacity $\tau_{off}$ can be estimated and actively adjusted based on OGC actuator position or clamping force. Thus, for a given $\tau_{off}$, Eq. (2) specifies a level of OCC torque capacity $\tau_{on}$ (112) required for achieving a desired output shaft torque 120.

During the torque phase, powertrain controller 75 and engine controller 77 control engine torque 114 or input shaft torque in order to maintain OGC slip at a desired level. This can be achieved, for example, by adjusting engine torque 114 using a closed-loop throttle control, valve timing control or fuel control or engine spark timing control based on OGC slip measurements independently from OCC and OGC torque control in a separate control loop or background loop, for the controller.

The transmission controller 83 (FIG. 1 could maintain enough OGC torque capacity during the torque phase without allowing OGC to slip. In this case, OGC still transmits a part of engine torque to shaft #1 (22).

Output shaft torque is described as:

$$\tau_{os} = G_{off}\tau_{in} + (G_{on} - G_{off})\tau_{on},\qquad \text{Eq. (4)}$$

where input shaft torque $\tau_{in}$ can be equated to input torque $\tau_e$ (when the transmission has no torque converter). Replacing $\tau_{os}$ with a desired torque profile $\tau_{os,des}$, Eq. (4) can be rearranged as:

$$\tau_{on} = \frac{\tau_{os,des} - G_{off}\tau_e}{G_{on} - G_{off}} \text{ or}$$

$$\tau_e = \frac{\tau_{os,des} - (G_{on} - G_{off})\tau_{on}}{G_{off}}.\qquad \text{Eq. (5)}$$

Torque variables $\tau_{os}$ and $\tau_e$ can be represented as:

$$\tau_{os,des} = \tau_{os_0} - \Delta\tau_{os} \text{ and } \tau_e = \tau_{e_0} + \Delta\tau_e,\qquad \text{Eq. (6)}$$

where $\tau_{es0}$ and $T_{e0}$ are the output shaft torque and engine torque at the beginning of the torque phase, respectively. $\Delta\tau_{os}$ and $\Delta\tau_e$ represent the change in output shaft torque and engine torque, respectively, at the elapsed time $\Delta t$ after the torque phase begins. Substituting Eq. (6) into Eq. (5) yields:

$$\tau_{on} = \frac{\Delta\tau_{os,des} + G_{off}\Delta\tau_e}{G_{off} - G_{on}}.\qquad \text{Eq. (7)}$$

OCC torque $\tau_{on}$ can be written as:

$$\tau_{on} = \tau_{on_0} + \Delta\tau_{on},\qquad \text{Eq. (8)}$$

where $\tau_{on0}$ is i the OCC torque capacity at the beginning of the torque phase and $\Delta\tau_{on}$ is the change in OCC torque at $\Delta t$. Substituting Eq. (8) into Eq. (7) results in:

$$\Delta\tau_{on} = \frac{\Delta\tau_{os,des} - G_{off}\Delta\tau_{off}}{G_{on}},\qquad \text{Eq. (9)}$$

where $\Delta\tau_{off} = \tau_e - \Delta\tau_{on}$. (Note that Eq. (9) takes the same form as Eq. (3), which is the governing equation for slipping OGC.)

The governing equations (5), (7) and (9) provide a systematic means to self-calibrate a level of OCC torque capacity ($\tau_{on}$) for achieving a desired output torque profile ($\tau_{os,des}$) during torque phase if OGC remains locked. More specifically, a torque profile $\tau_{os,des}$ can be specified to smoothly transition the output shaft torque 120 from a time before the torque phase to a time after the torque phase, thereby eliminating or reducing a torque hole. For a given $\tau_{in}$ or $\tau_e$, Eq. (5) specifies a level of OCC torque capacity $\tau_{on}$ required for achieving the target output torque profile $\tau_{os,des}$.

Alternatively, for a given oncoming clutch torque, Eq. (5) may be used to systematically determine a target engine torque $\tau_e$ or $\tau_{in}$ required for achieving desired output shaft torque $\tau_{os,des}$. Once the target level is determined, $\tau_e$ or $\tau_{in}$ can be controlled through engine throttle control, spark timing control, intake and exhaust valve timing control, or through an auxiliary torque source such as an electric motor. (Note that engine torque control is coupled to OCC torque control in Eq. (5)).

The inertia phase begins at 73 in FIG. 4 when OGC is released. OGC transmits torque only at a non-significant level while OCC carries enough torque capacity, as shown at 122, to slow down input speed 124 so that it is closer to shaft #2 speed, as shown at 126. Under this condition, both Eq. (3) and Eq. (5) can be reduced to:

$$\tau_{on} = \frac{\tau_{os,des}}{G_{on}}.\qquad \text{Eq. (10)}$$

Thus, the output shaft torque $\tau_{os}$ (120) in the inertia phase is primarily affected by OCC torque capacity $\tau_{on}$ (122). According to the present invention, Equation (10) is used to provide a target OCC torque capacity $\tau_{on}$, during the inertia phase, that is required to achieve a seamless output shaft torque profile $\tau_{os,des}$ (120) from the torque phase to the inertia phase. $\tau_{on}$ is a feed-forward term. In addition, there is a feedback as well as an effect of a change in engine torque.

FIG. 4 shows reduced input torque during the inertia phase. This is typically due to engine spark timing control according to a common practice in a conventional shift control method, enabling OCC to engage within a target shift duration without requiring excessive torque capacity. The shift event is completed when OCC is securely engaged, thereby coupling input shaft 10 and shaft #2 (24). The engine torque reduction then is removed at 130 and the output shaft torque returns to a level 132, which corresponds to an engine torque level in the high gear configuration.

Figure 5:
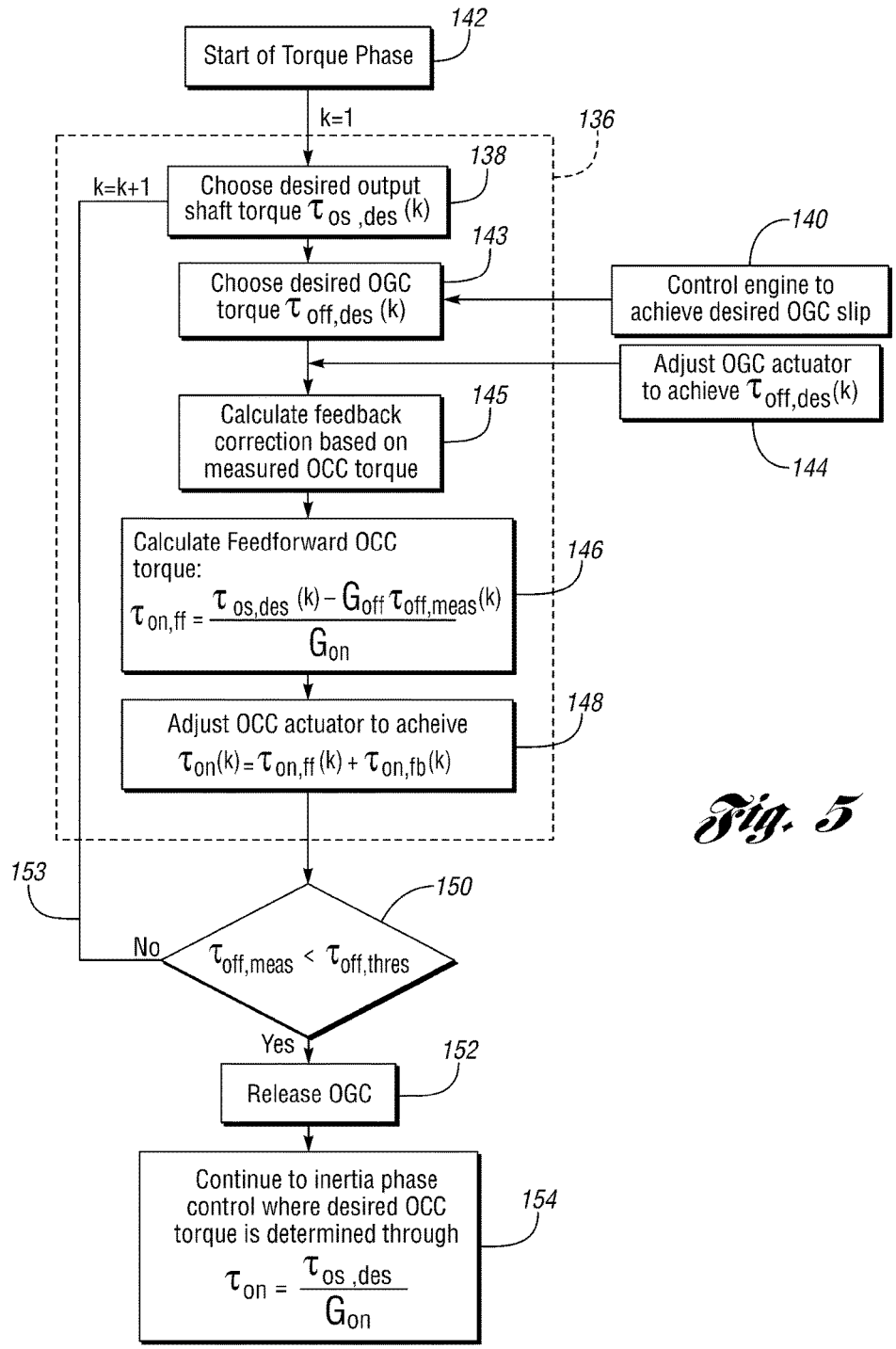
FIG. 5 is a functional flowchart showing the control strategy of the synchronous upshift control of the present invention when the off-going clutch is slipping.

FIG. 5 shows a control flow chart for the synchronous shift control of the present invention when the OGC is slipped during a torque phase. It describes a systematic approach to enable the shift control shown in FIG. 4. As previously stated, one of the advantages of this invention is the decoupling of OCC control, shown inside the dashed line 136, from engine control 140 and OGC control 144.

Engine torque can be actively and independently managed at 140 through a closed loop control to achieve a desired OGC slip speed. OGC torque capacity is adjusted through either closed loop control or open-loop control of its actuator position or actuator force. During a torque phase, a controller first chooses a desired level of output shaft torque (138). It also chooses desired OGC torque at 143.

Having chosen the desired OGC torque at 143, the engine is controlled at 140, as previously described, to achieve the desired slip. Simultaneously, the OGC actuator is adjusted at 144 to achieve the desired OGC torque.

A feedback torque correction, ($\tau_{on,fb}(k)$), is calculated at 145 based on a measurement of oncoming clutch torque. Alternatively, ($\tau_{on,fb}(k)$) can be determined from calculated OCC torque based on torque measurements at other locations such as an output shaft. This correction is needed because of the inherent variability in the development of clutch torque. As previously indicated, the variability is due to unforeseen or uncharacteristic variation, or irregularities in the clutch actuator transfer function. Further, irregularities can be due, for example, to temperature changes, viscosity changes, wear of mechanical elements in the actuator structure, debris, rate of cooling of actuator fluid, etc. The increasing oncoming clutch torque shown at 93 in the plot for a synchronous clutch-to-clutch upshift is based upon a theoretical model. In actual practice, the response of the clutch actuator to a pressure command is affected by environmental factors, as mentioned.

The plot, as shown at 112' in FIG. 4, is represented by an irregular dotted line torque correction superimposed on a linear dotted line 112. The correction is a feedback that opposes transient torque irregularities. It is derived from torque sensor measurements. The linear dotted line 112 is a theoretical linear time trace of oncoming clutch pressure (or whatever actuating parameter for the given clutch system) corresponding to the time trace shown at 93 in FIG. 3. The strategy of the present invention will decrease the torque transients so that a resultant oncoming clutch pressure trace will resemble more closely the linear dashed line shown in FIG. 4 at 112. This oncoming clutch torque correction is based on an actual torque value using one or more torque sensors indicated at 10' and 39' in FIG. 1. Torque sensor 10' measures input shaft torque and torque sensor 39' measures output shaft torque. The torque sensor measurements can be used if the gear ratio associated with the off-going clutch ($G_{off}$) and the gear ratio associated with the oncoming clutch ($G_{on}$) are known. A calculation of a feed-forward oncoming clutch torque, which is based upon the desired OGC torque, is shown at 146 in FIG. 5.

Correcting for the difference between the commanded torque in a previous processor control loop (k-1) and the current measurement in the current processor control loop (k) is carried out at step 148 in FIG. 5.

The oncoming clutch feedback torque can be calculated also using other sensors, such as an input shaft speed and an output shaft speed. Thus, the oncoming clutch feedback torque can be expressed as a function of the input shaft torque sensor reading, the output shaft sensor reading, the input shaft speed sensor reading and the output shaft speed sensor reading. The equations for accomplishing this are set out in the co-pending patent applications previously described; i.e., application Ser. No. 12/861,387 and Patent Publication 2010/0262344, which are assigned to the assignee of the present application.

After the controller uses Equation (3) to self-calibrate the required level of OCC torque capacity at 146, it adjusts OCC actuator position at 148 or its torque capacity to realize the desired output shaft torque. The controller evaluates whether the end of the torque phase is reached at 150 based upon a calibrated threshold OGC torque. If it is not, it repeats the control loop, as shown at 153. It re-estimates the desired output shaft torque at 138 and chooses OGC torque at 143 for the next controller loop time step k+1.

The end of the torque phase is reached when OGC torque becomes sufficiently small or less than a pre-specified threshold, $\tau_{thresoff}$, at 150. The controller then releases the OGC clutch at 152 and moves to the inertia phase control at 154. Equation (10) is used to determine a target OCC torque at 154 for a seamless output shaft torque transition from the torque phase to the inertia phase.

Figure 6:
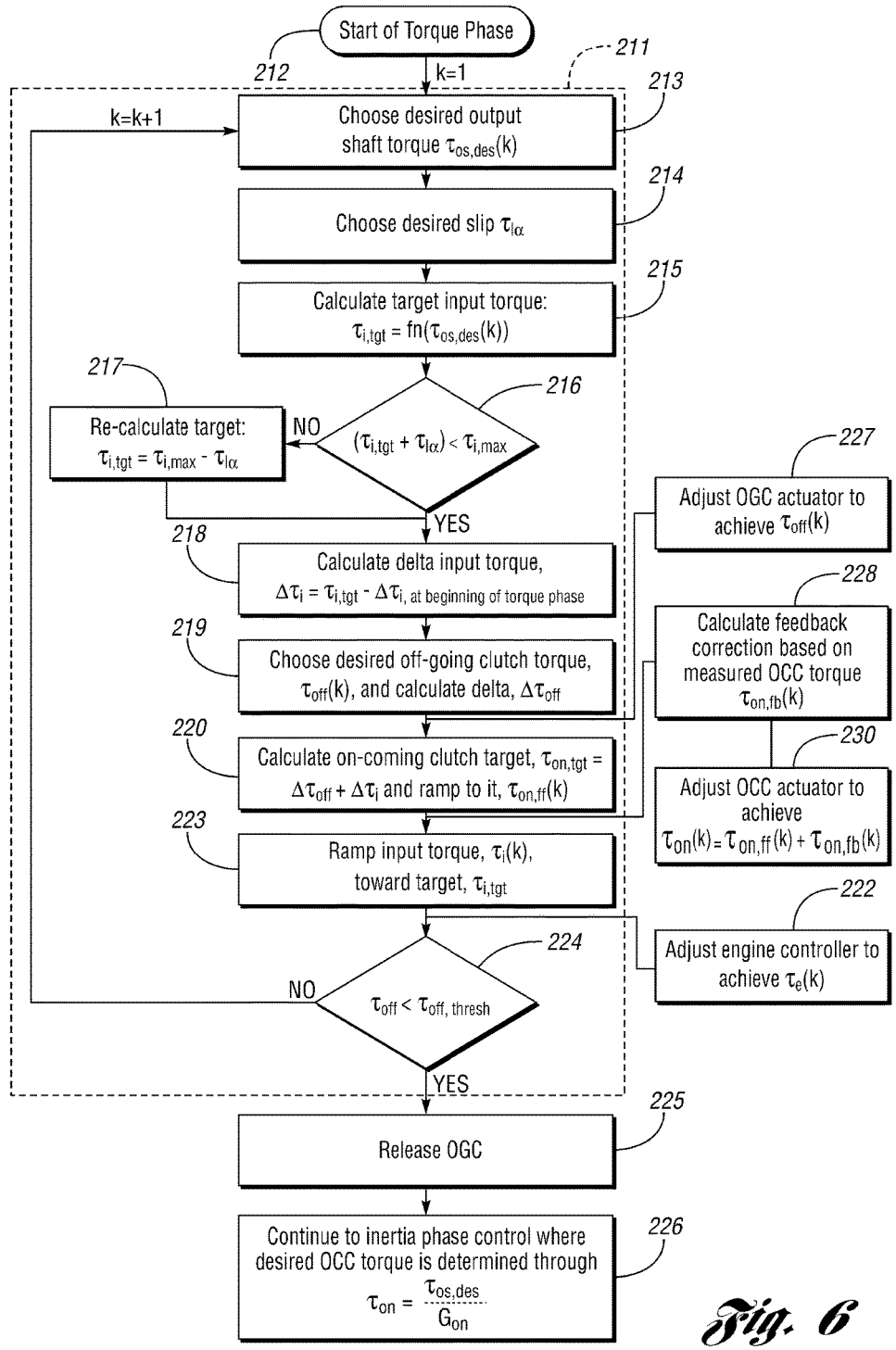
FIG. 6 is a functional flowchart showing an alternate control strategy for a non-synchronous upshift when the off-going clutch is slipping.

FIG. 6 illustrates an alternate control strategy that will achieve the oncoming clutch torque characteristics, the off-going clutch torque characteristics and the engine torque characteristics that will avoid output shaft torque disturbances previously described. As previously indicated, in the strategy of FIG. 5, the output shaft torque that is chosen is used to calculate an oncoming clutch torque as shown at block 146 in FIG. 5. Regardless of whether the strategy of FIG. 5 or the strategy of FIG. 6 is used, the objective is to ensure that the engine torque will be higher throughout the duration of the torque phase than the oncoming clutch torque. The engine speed will remain above the off-going clutch speed during the torque exchange that occurs during the torque phase, as seen in FIG. 4. This prevents a torque reversal.

In FIG. 6, prior to the start of the torque phase at block 212, the off-going clutch torque will have decreased to a value that is slightly less than the input torque. This occurs during the preparatory stage as seen in FIG. 4. A desired output shaft torque then is chosen as shown at 213 rather than a desired off-going clutch torque following the step at 213. As in the case of the FIG. 5 strategy routine, a desired slip is chosen at 214 as seen in FIG. 6. The value chosen is a value that will prevent torque source input speed flare during the torque phase. The slip torque depends upon the rate of change of engine speed (a) as well as engine inertia (I) if an engine is the torque source. This is seen at 214 and 217.

After the desired slip is determined at block 214, a target input torque is determined at block 215. This input torque ($\tau_{i,tgt}$) is a function of desired output shaft torque. The target input torque is that torque that exists for each control loop of the controller until the shift sequence reaches the end of the torque phase. If the sum of the target input torque and the desired slip torque is less than a precalibrated maximum value, as shown at block 216, the routine will continue to block 218 where a change in input torque ($\Delta_{\tau i}$) at any instant during the torque phase is equal to the target input torque ($T_{i,tgt}$) minus the change in input torque ($\Delta_{\tau i}$) at the beginning of the torque phase. If the sum of the target input torque and the slipping clutch torque at 216 is greater than $\tau_i$ maximum, the routine is recalculated at 217 until the inquiry at 216 is true.

A desired off-going clutch torque $\tau_{off}(k)$ is chosen at 219, and delta off-going torque $\Delta_{\tau off}$ also is calculated at 219. The off-going clutch actuator is adjusted accordingly at 227. Oncoming clutch target torque, $\tau_{on},\tau_{gt}$, is calculated at 220 using the equation $\tau_{on},\tau_{gt} = \Delta_{\tau off} + \Delta_{\tau i}$, which is ramped to $\tau_{on,ff}(k)$. A feedback correction $\tau_{on,fb}(k)$ based on measured OCC torque (torque sensor output) is determined at 228 and the OCC actuator is adjusted at 230 to achieve $\tau_{on}(k)$, which is equal to $\tau_{on,ff}(k) + \tau_{on,fb}(k)$. The input torque $\tau_i(k)$ then is ramped at 223 toward target input torque $\tau_i$,tgt. The subscript ff designates a feed-forward term, the subscript fb is a feed-back term and k is a control loop indicator. The engine controller is adjusted to achieve engine torque $\tau_e(k)$.

If $\tau_{off}$ is less than a calibrated threshold at block 224, the routine will return to the beginning and then repeat in the next control loop k+1. Otherwise, the OGC will be released at 225, where desired OCC torque is determined by the equation $\tau_{on} = \tau_{os,des}/G_{on}$. "G" is gear ratio of gearing in the OCC torque flow path.

The oncoming clutch target torque ($\tau_{on,tgt}$) is computed by determining the sum of the delta off-going clutch torque at 219 (change of torque) and the delta input torque calculated at 218 at the beginning of the torque phase. The OGC actuator is adjusted at 227 to achieve the OGC torque chosen at step 219. The input torque then is ramped upwardly to the feed-forward target. This is the value for oncoming clutch torque at the end of the torque phase.

The step of ramping the input torque is shown at 223 in FIG. 6. If the result of the ramping at 223 is an off-going clutch torque that is less than the off-going clutch threshold value, which is precalibrated, the off-going clutch will be released at shown at 225. As in the case of the routine of FIG. 5, the routine proceeds to the inertia phase where the desired oncoming clutch torque is determined by the equation shown at 226.

Figure 7:
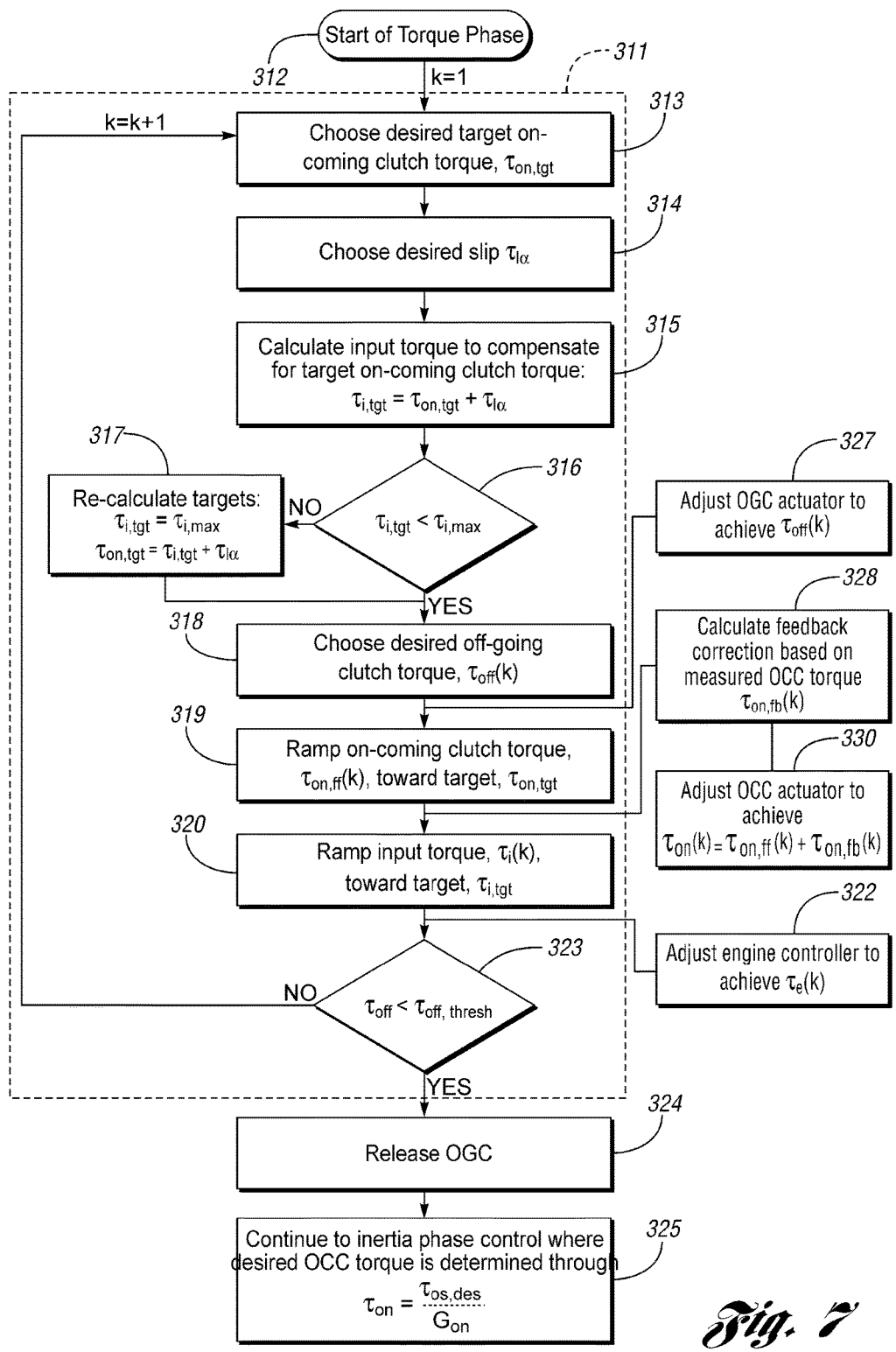
FIG. 7 is a functional flowchart showing another alternate control strategy for a non-synchronous upshift when the off-going clutch is slipping.

The routine 311 of FIG. 7 is somewhat similar to the routine 211 of FIG. 6 except, for example, a desired target oncoming clutch torque is chosen following the start of the torque phase at 312. This is shown at block 313 in FIG. 7. In contrast, the desired output shaft torque is chosen in the case of FIG. 6 starting at the beginning of the torque phase. After choosing a desired slip at 314, the routine of FIG. 7 will calculate an input torque at 315 so that the input torque will be sufficiently increased to accommodate the target oncoming clutch torque. This is evident by the rising slope of the input torque plot of FIG. 4 during the torque phase.

If the target input torque is greater than the maximum calibrated input torque, as shown at 316, the target input torque and the oncoming clutch torque target torque are recalibrated at 317 before the routine will continue.

If the inquiry at block 316 is true, the routine will advance to block 318 where a desired off-going clutch torque is chosen. This is the value at the end of the torque phase. Having established the desired off-going clutch torque, the oncoming clutch torque is ramped toward the target oncoming clutch torque at 319. The clutch actuator for the oncoming clutch torque is adjusted at 321 to achieve the target oncoming clutch torque. The routine then will continue to block 320 in FIG. 7 where the input torque is ramped toward the target torque at the end of the torque phase, followed by a controller adjustment at 322 to achieve the target.

A test then is made at 323, as in the case of the routine of FIG. 6, to determine whether the off-going clutch torque is less than a precalibrated off-going clutch torque threshold. The threshold torque is determined so that a residual torque will be maintained in the clutch actuator rather than having the off-going clutch torque fall to zero. The off-going clutch torque then is released and the routine continues to the inertia phase as shown at 324 and 325.

The control routine steps carried out at action blocks 328, 320, and 322 in FIG. 7 correspond, respectively, to the steps carried out at 228, 230, and 222 in FIG. 6. The OCC feedback correction is made at this point in the control routine.

Figure 9:
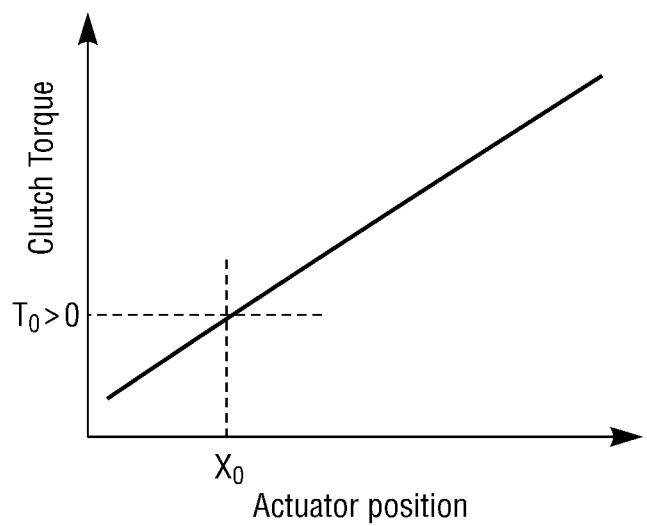
FIG. 9 is a plot of a transfer function for a clutch which is used to calculate clutch torque for a given clutch actuator position.

The clutch actuators may be fluid pressure actuators with a servo piston wherein piston movement during clutch engagement can be measured. During pre-calibration, a transfer function between actuator position and clutch slip torque is obtained by bench testing. The transfer function is stored in the memory of microprocessor 75 for vehicle control, including torque hole filling control. The transfer function is shown in FIG. 9, which is a plot of actuator position versus clutch torque. At point "$X_0$" in FIG. 9, there will be an actuator position corresponding to a minimum non-zero clutch torque. The transfer function is shown as a linear relationship of position and torque, but the relationship can be of any shape other than a linear shape.

It is difficult to determine a position "$X_0$" where a clutch actually starts assuming non-zero torque $T_0$. Point "$X_0$" is affected by unit-to-unit hardware variability, assembly process and clutch plate wear. An error in "$X_0$" results in an inaccurate clutch torque estimate that affects torque hole fill control.

When torque measurements are available at the input shaft between the engine and the clutches, "$X_0$" can be accurately determined because when the oncoming clutch starts assuming non-zero torque at $T_0$, the measured input shaft torque momentarily increases because the clutch exerts additional load on the shaft. When "$X_0$" is accurately known for both clutches, slipping oncoming clutch torque and slipping off-going clutch torque can be readily calculated using their transfer functions. Then their torque values are adjusted to be consistent with overall input shaft torque measurements.

Figure 8:
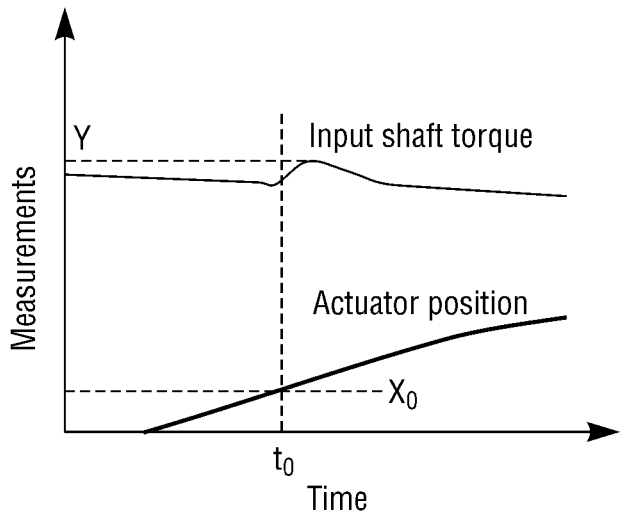
FIG. 8 is a plot of the relationship of the position of a clutch actuator and the input shaft torque with respect to time during a torque phase.

For example, the torque sensor 10' in FIG. 1 will give an accurate torque value of the sum of the clutch slip torques of the OGC and the OCC. The torque sensor 10' will provide an accurate measurement of the torque "Y" in FIG. 8. A correlation of that accurate measurement with the measurement of the position of the oncoming clutch will give an accurate measurement of OCC torque that can be subtracted from the accurate torque measurement at 10' of the sum of the OCC torque and the OGC torque at any given instant during the torque exchange in the torque phase. That then will give an accurate value for the OGC torque.

It is to be understood that this invention is not limited to the exact shift control steps illustrated and described. Various modifications and equivalents thereof, including revisions to the governing equations (3), (5), (7) and (9), may be made by persons skilled in the art without departing from the spirit and the scope of the invention to make this invention applicable to all types of automatic transmissions, including both a lay-shaft type and a planetary type.

What is claimed is:
1. A powertrain comprising:
    a multiple-ratio transmission with oncoming and off-going clutches for effecting a ratio-upshift;
    a torque sensor for measuring a clutch torque one of the off-going and oncoming clutches during a torque phase; and
    a shift controller programmed to: release the off-going clutch if the measured clutch torque indicative of an off-going clutch torque is less than a threshold to effectuate the ratio-upshift.
2. The powertrain set forth in claim 1 wherein the shift controller, during the torque phase of the upshift, is further programmed to:
    adjust the oncoming clutch torque if the off-going clutch torque is not less than the threshold.
3. The powertrain set forth in claim 2 wherein the shift controller, during the torque phase of the upshift, is further programmed to:
    estimate the oncoming clutch torque based on the measured clutch torque.
4. The powertrain set forth in claim 1, wherein the shift controller, during the torque phase of the upshift, further programmed to:
    increase torque input at a controlled rate.

5. The powertrain set forth in claim 4 wherein the shift controller, during the torque phase of the upshift, is further programmed to:
control torque input and pressure of the off-going clutch to achieve a desired amount of slip in the off-going clutch.

6. The powertrain set forth in claim 1 further comprising at least two torque sensors,
wherein one torque sensor measures the clutch torque of one of the off-going and oncoming clutches, and the other torque sensor measures an. input torque.

7. The powertrain set forth in claim 1 wherein the controller has memory registers with a stored transfer function for each clutch, and the transfer function is precalibrated with a functional relationship between a clutch actuator displacement and the measured clutch torque.

8. The powertrain set forth in claim 1 further comprising at least two torque sensors,
wherein one torque sensor measures a sum of torque input for each clutch; and
the other torque sensor measures a torque output of one of the clutches, whereby torque output of the other clutch is equal to a difference between torque measured by the one torque sensor and the torque measured by the other torque sensor.

9. The powertrain set forth in claim 1 wherein the shift controller is further programmed to:
calculate an oncoming feed-forward clutch torque as a function of a desired output shaft torque and measured off-going clutch torque followed by an inertia phase of the upshift.

10. The powertrain set forth in claim 1 wherein the shift controller, during the torque phase of the upshift, is further programmed to:
controlling an engine to achieve an increasing torque input and a controlled slip of the off-going clutch.

11. The powertrain set forth in claim. 1 wherein the shift controller is further programmed to:
calculate a target input torque based on. the desired output shaft torque and a desired input shaft slip torque;
calculate an oncoming clutch torque target as a function of a change in off-going clutch torque during the torque phase and a change in torque of the input shaft;
calculate a feedback correction based on a measured oncoming clutch torque and the target clutch torque; and
ramp input torque toward the target input torque.

12. A method for controlling a multiple-ratio transmission comprising:
measuring a torque of at least one of an oncoming and off-going clutch during a torque phase; and
releasing the off-going clutch if the measured torque indicative of an off-going clutch torque is less than a threshold to effectuate a ratio-upshift.

13. The method of claim 12 wherein during the torque phase of the ratio-upshift, the method further comprises:
adjusting the oncoming clutch torque if the off-going clutch torque is not less than the threshold.

14. The method of claim 13 wherein during the torque phase of the ratio-upshift, the method further comprises:
estimating the oncoming clutch torque based on the measured clutch torque.

15. The method of claim 12 wherein during the torque phase of the ratio-upshift, the method further comprises:
controlling torque input and a pressure of the off-going clutch to achieve a desired amount of slip in the off-going clutch.

16. The method of claim 12 wherein during the torque phase of the ratio-upshift, the method further comprises:
measuring a torque of at least one of an oncoming and off-going clutch with a first torque sensors; and
measuring an input torque with a second torque sensor.

17. The method of claim 12 wherein during the torque phase of the ratio-upshift, the method farther comprises:
measuring a sum of torque input for each clutch with a first torque sensor; and
measuring a torque output of one of the clutches with a second torque sensor, whereby torque output of the other clutch is equal to a difference between torque measured by the one torque sensor and the torque measured by the other torque sensor.

18. The method of claim 12 wherein during the torque phase of the ratio-upshift, the method further comprises:
choosing a desired output shaft torque and a desired input shaft slip torque;
calculating a target input torque during a torque phase of an upshift;
calculating an oncoming friction element torque target as a function of a. change in off-going friction element torque during the torque phase and a change in torque of the input shall and ramping oncoming clutch torque to the torque target;
measuring actual oncoming friction element torque during the torque phase and calculating a feedback correction based on measured oncoming friction element torque; and
ramping input torque toward the target input torque.

19. The method of claim 12 wherein during the torque phase of the ratio-upshift, the method further comprises:
increasing torque input at a controlled rate during a torque phase off ratio upshift;
estimating oncoming friction element torque during the torque phase of the upshift;
controlling torque input to achieve a desired off-going friction element slip;
measuring actual friction element torque for the torque transmitting friction elements of the transmission; and
correcting estimated oncoming friction element torque using the measured torque whereby a target torque for the oncoming friction element is achieved, with minimal torque transients during the torque phase.

20. The method of claim 12 wherein. during the torque phase of the ratio-upshift, the method further comprises:
increasing a transmission input torque during the torque phase;
choosing a desired output shaft torque and a desired off-going friction element torque;
controlling input torque to achieve desired off-going friction element slip;
measuring oncoming and off-going friction element torque; and
calculating an oncoming feed-forward friction element torque as a function of chosen output shaft torque and measured off-going friction element torque followed. by an inertia. phase of the upshift.

* * * * *